(12) United States Patent
Kabirzadeh

(10) Patent No.: US 12,545,292 B1
(45) Date of Patent: Feb. 10, 2026

(54) CLOSED LOOP REPLAY-BASED SIMULATIONS

(71) Applicant: Zoox, Inc., Foster City, CA (US)

(72) Inventor: Rasoul Kabirzadeh, Redwood, CA (US)

(73) Assignee: Zoox, Inc., Foster City, CA (US)

( * ) Notice: Subject to any disclaimer, the term of this patent is extended or adjusted under 35 U.S.C. 154(b) by 254 days.

(21) Appl. No.: 17/192,501

(22) Filed: Mar. 4, 2021

(51) Int. Cl.
*B60W 60/00* (2020.01)
*B60W 50/06* (2006.01)
*G05B 17/02* (2006.01)

(52) U.S. Cl.
CPC ........ *B60W 60/0015* (2020.02); *B60W 50/06* (2013.01); *G05B 17/02* (2013.01); *B60W 2420/403* (2013.01); *B60W 2420/408* (2024.01); *B60W 2420/54* (2013.01); *B60W 2554/4029* (2020.02)

(58) Field of Classification Search
CPC ............. B60W 50/06; B60W 60/0015; B60W 2420/42; B60W 2420/52; B60W 2420/54
See application file for complete search history.

(56) References Cited

U.S. PATENT DOCUMENTS

| | | | | |
|---|---|---|---|---|
| 10,852,721 | B1 * | 12/2020 | Smith | G06F 11/3684 |
| 2016/0314224 | A1 * | 10/2016 | Wei | G05D 1/0088 |
| 2019/0302259 | A1 * | 10/2019 | Van Fleet | G01S 15/8997 |
| 2021/0088784 | A1 * | 3/2021 | Whitmire | G02B 27/0101 |
| 2021/0104171 | A1 * | 4/2021 | White | G06N 7/01 |
| 2021/0286925 | A1 * | 9/2021 | Wyrwas | G06V 20/56 |
| 2021/0318121 | A1 * | 10/2021 | Laroche | G01C 11/025 |
| 2022/0161811 | A1 * | 5/2022 | Lu | B60W 60/0053 |
| 2022/0198107 | A1 * | 6/2022 | Pedersen | G06F 11/3696 |
| 2022/0204009 | A1 * | 6/2022 | Choi | G06F 11/3696 |
| 2022/0269279 | A1 * | 8/2022 | Redford | G06N 3/006 |
| 2023/0021615 | A1 * | 1/2023 | Inaba | F16D 61/00 |

* cited by examiner

*Primary Examiner* — Toya Pettiegrew
(74) *Attorney, Agent, or Firm* — Lee & Hayes, P.C.

(57) ABSTRACT

Techniques for simulating environments are discussed herein. For example, a simulated autonomous vehicle may have simulated sensors to generate simulated sensor data based on log data. Using the log data, a simulated environment for testing a simulated vehicle may be generated. The simulated environment may represent the environment in which the real-world vehicle was operating. The techniques may further include generating simulated sensor data by the simulated sensors and sending the simulated sensor data to an autonomous vehicle controller where a trajectory of the simulated autonomous vehicle may be determined based on the simulated sensor data. In this way, an autonomous vehicle controller need not rely on the position of the vehicle in the original log data, and instead accurate simulated sensor data can be generated to determine accurate occlusions, amongst other things.

20 Claims, 6 Drawing Sheets

SIMULATED DATA (E.G., SIMULATED LIDAR DATA) AT TIME T=0

LOG DATA (E.G., LIDAR DATA) AT TIME T=0

CLOSED LOOP REPLAY-BASED SIMULATIONS

BACKGROUND

Simulated data and simulations can be used to test and validate functionality of vehicle systems, which could be otherwise prohibitive to test in the real-world (e.g., due to safety concerns, limitations on time, repeatability, etc.). However, creating simulations that both accurately reflect real-world scenarios and validate functionality of vehicle systems is a difficult challenge. For instance, when simulations are based on data that was previously captured by a vehicle operating in the real-world, the tested vehicle systems undergoing simulation can react differently than the real-world vehicle that captured the data. This can make it difficult to verify that the tested vehicle systems are accurate.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
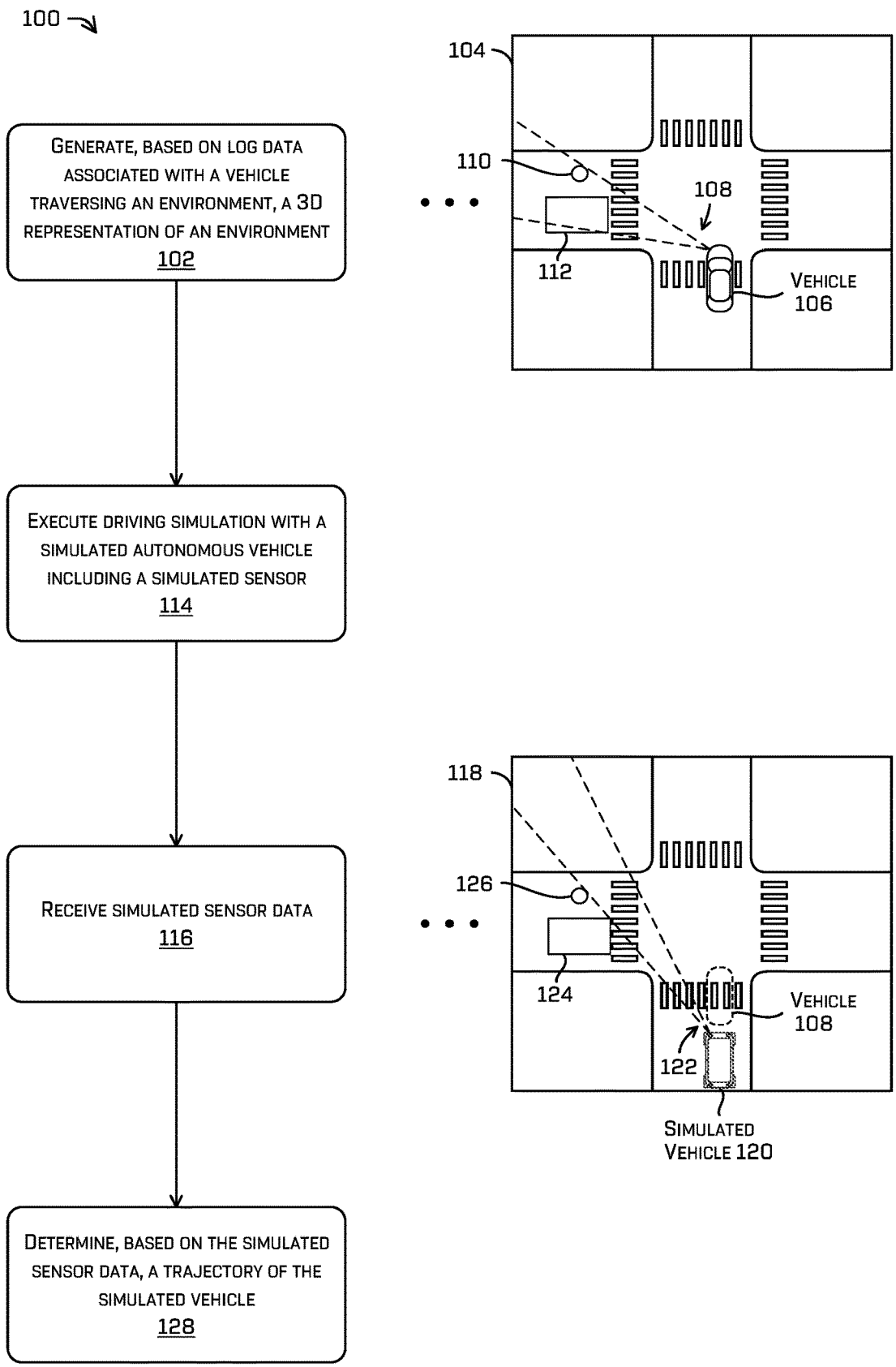
FIG. 1 is a pictorial flow diagram illustrating an example data flow in which vehicle(s) generate log data associated with an environment and transmit the log data to computing device(s) to generate a three-dimensional representation of the environment for executing autonomous vehicle simulations and/or autonomous vehicle sensor simulations.

Techniques for simulating environments are discussed herein. For example, techniques are discussed herein for executing closed loop driving simulations of a simulated autonomous vehicle having simulated sensors to evaluate the functionalities and performance of vehicle control systems. As discussed above, creating simulations that accurately reflect real-world scenarios and validate functionality of vehicle systems is a difficult challenge. For instance, when simulations are based on data that was previously captured by a vehicle operating in the real-world, the tested vehicle systems undergoing simulation can react differently than the real-world vehicle that captured the data. This can make it difficult to verify whether the tested vehicle systems are accurate. For instance, a simulated vehicle's point of view can differ from that of a logging vehicle in real world scenarios, but the perception is still based on the logging vehicle's location. Additionally, a vehicle operator can take over for an autonomous logging vehicle in real world scenarios, if needed, regardless of the logging vehicle's perception. These discrepancies in perception can decrease the accuracy of simulations and even invalidate results in high divergence cases.

During execution of log-based driving simulations in a simulated environment, the simulation system may rely on detected objects that are present in the real-world and represented by the log data when controlling a simulated vehicle traversing the simulated environment. For instance, a planning component may utilize an indication of an observed object in the log data when determining a trajectory for the simulated vehicle. However, executing a simulation in such a manner may not consider a divergence between the position of the simulated vehicle and the position of the real-world vehicle due to differences in execution of the planning component running on the real-world vehicle and the planning component running on the simulated vehicle. For instance, the planning component running on the simulated vehicle may consider a first object visible from a point of view of the real-world vehicle at a specific point in time while the first object may be occluded from a point of view of the simulated vehicle by a second object at a simulated time corresponding to the same point in time.

Additionally, in some instances, detected events that occurred in the real world (e.g., a disengagement event by a vehicle operator) and are represented in the log data may not provide sufficient data for the simulation system to execute an accurate simulation. For instance, an object may have a path of travel that will intersect with a trajectory of a real-world vehicle at a point in time. In some instances, the object may be occluded from and/or out of range of the real-world vehicle, and a vehicle operator onboard the real-world vehicle may notice the oncoming object and take over control to stop the vehicle and avoid a potential collision. However, log data may only represent the disengagement event, and may not include a representation of the object. During execution of a log-based driving simulation, this may cause a simulated vehicle to traverse beyond the disengagement event unaware of the oncoming object.

While the log-test framework provides the ability to generate very accurate three-dimensional representations of and environment and accurate object movement, such testing methods may be limited. For example, during such tests, it may be impossible to accurately calculate an occlusion grid for a simulated vehicle. Additionally, such scenarios are often recreated by hand or by attempting to convert vehicle logs to synthetic scenarios, which often produce different object movement and/or unintended changes to the scenarios.

Accordingly, this disclosure describes techniques for improving driving simulations of three-dimensional environments generated based on vehicle logs by utilizing a simulated sensor, associated with a simulated vehicle of the simulation, to perceive simulated objects at simulation time and processing simulated sensor data with a planning component and/or prediction component to determine a trajectory of the simulated vehicle. For instance, the techniques may include receiving log data representing an environment in which a vehicle (e.g., log vehicle) was operating and generating, based on the log data, a three-dimensional simulated environment, corresponding to the environment, for testing a vehicle controller. In some instances, a driving simulation, including a simulated autonomous vehicle having simulated sensors, may be executed, in which the simulated vehicle traverses the simulated environment under the control of the vehicle controller. In some instances, the simulated sensor may generate simulated sensor data representing the simulated environment and/or one or more simulated objects therein. The simulated sensor data may then be processed by at least one component of the vehicle controller (e.g., a perception component, a prediction component, and/or a planning component) to determine a trajectory of the simulated vehicle.

Accordingly, the techniques discussed herein can achieve highly accurate occlusion calculations from a point of view of the simulated vehicle by perception processing the simulated sensor data. Additionally, when a disengagement event occurs on the real-world vehicle, driving simulations can be accurately conducted to see what may happen if the vehicle operator had not disengaged, in which the simulated vehicle would most likely diverge from the vehicle operator's actions, allowing for accurate reaction of the simulated vehicle based on the simulated sensor data during testing of such scenarios. Additionally, the techniques may further include an easier and improved method to test targeted "what-if" scenarios, potentially with changes to the situations observed by the real-world vehicle, such as, for example, changing the type of an entity in the recorded world (e.g., changing a car to a cyclist), changing attributes associated with an entity in the recorded world (e.g., changing the color of a car), and so forth. This provides the ability to process perception on the simulated sensor data and analyze accurate simulated results of the targeted changes.

For instance, a simulation system may execute a driving simulation in a simulated environment. An autonomous vehicle controller associated with the simulation system may receive simulated sensor data from a simulated vehicle traversing the environment. A perception component, processing component, and/or a planning component of the vehicle controller may process such simulated sensor data to identify simulated objects in the simulated environment from a point of view of the simulated vehicle, thus generating highly accurate occlusion calculations for the simulated vehicle (e.g., a first object occluding a second object from the point of view of the simulated vehicle). Processing the simulated sensor data in such a manner may allow the vehicle controller to determine a trajectory of the simulated vehicle and react to objects and/or events detected by the simulated sensor data and from the point of view of the simulated vehicle.

Additionally, or alternatively, during execution of such driving simulations, the simulation system may include an object component for accurately testing various "what-if" scenarios and changes to situations observed by the real-world vehicle. In some instances, the object component may access and/or maintain an object database (interchangeably referred to throughout as an "entity database") allowing the simulation system to make changes to objects and/or entities in the world recorded by the real-world vehicle. For example, the object component may be configured to change the color of a particular object (e.g., a vehicle) from white to black (or any other colors contemplated), and the simulated sensors may regenerate simulated sensor data, potentially resulting in less lidar returns from a black vehicle than the white vehicle and perception, prediction, and/or planning results may be reprocessed. Additionally, or alternatively, the object component may be configured to change the type of a particular object (e.g., from a cyclist to a car), resulting in changes to behavior and/or characteristics of the object, and the simulated sensors may regenerate simulated sensor data, potentially resulting in the new type of object moving at changed speed and/or occluding (or no longer occluding) additional objects. Further, the object component may be configured to identify a simulated agent model corresponding to the type of a simulated object identified in the simulated environment and interpolate and/or extrapolate a path of travel of the simulated object throughout the simulated environment based on the simulated agent model.

The techniques described herein can be implemented in a number of ways. Example implementations are provided below with reference to the following figures. Although discussed in the context of an autonomous vehicle, the techniques described herein can be applied to a variety of systems requiring control and/or interaction with objects in an environment and is not limited to autonomous vehicles. In another example, the systems, methods, and apparatuses can be used in an aviation or in a nautical context. Additionally, the techniques described herein can be used with real data (e.g., captured using sensor(s)), simulated data (e.g., generated by a simulator), or any combination thereof.

FIG. 1 is a pictorial flow diagram illustrating an example data flow 100 for generating, based on log data representing an environment in which a vehicle (e.g., log vehicle) was operating, a three-dimensional representation of the environment (e.g., a simulated environment), and executing a driving simulation including a simulated autonomous vehicle, having one or more simulated sensor(s), traversing the simulated environment under the control of an autonomous vehicle controller configured to determine a trajectory of the simulated vehicle based on simulated sensor data generated by the simulated sensor(s). In various implementations, some or all of the operations in process 100 may performed by driving simulation components, such as simulation component(s) described in more detail below.

At operation 102, a simulation component may receive log data, representing an environment 104, from a vehicle 106 traversing the environment 104. In various examples, the log data may include data stored by a real or simulated vehicle traversing a real or simulated environment. As shown in the environment 104, a vehicle 106 may traverse the environment 104 including a number of entities and/or other objects. The log data may include observed data 108 observed and/or perceived by the vehicle 106, such as data identifying characteristics of the environment, entities and/ or objects, such as, for example, a first object 110 (e.g., a cyclist) and/or a second object 112 (e.g., a vehicle), detected within the proximity of and/or within a point of view of the vehicle 106. Attributes and/or characteristics of the environment 104, the entities 110, 112, and/or other objects may include, but are not limited to, classifications, sizes, shapes, positions, yaws, velocities, trajectories, and the like. In some instances, the log data may include operations and/or behaviors of the entities 110, 112 and/or other objects, as well as events observed by the vehicle 106, such as accidents or near accidents, traffic violations, crossing or jaywalking by pedestrians, cyclists, or animals, weather anomalies, construction zones, detours, school zones, etc. These particular events or behaviors may be designated from a list of events/behaviors that are desirable for use as driving simulations.

The log data received in operation 102 may include raw sensor data and/or data based on sensor data associated with the vehicle 106, such as bounding boxes, velocities, classifications, object dimensions, predictions, object track information, control signals, etc. Examples of data generated by a vehicle 106 that can be included in the log data can be found, for example, in U.S. patent application Ser. No. 15/644,267, titled "Interactions Between Vehicle and Teleoperations System," filed Jul. 7, 2017, U.S. patent application Ser. No. 15/693,700 titled "Occupant Protection System Including Expandable Curtain and/or Expandable Bladder" and filed Sep. 1, 2017, and U.S. patent application Ser. No. 16/198,653 titled "Executable Component Interface and Controller" filed Nov. 21, 2018, each of which is incorporated by reference herein in its entirety and for all purposes.

In some implementations, the simulation component may generate one or more three-dimensional representations of the environment 104 based at least partly on the log data. To generate the log-based representations of the environment 104, the simulation component may use the log data received in operation 102 to generate instructions that, when executed by a computing device associated with the simulation component, generate the simulated environment. Additional log data that may be used to generate a log-based representation of an environment 104 can include perception data, prediction data, and/or status data indicating diagnostic information, trajectory information, and other information generated by the vehicle 106.

In some instances, when generating a log-based representation of the environment 104, a simulation component can omit objects represented in the log that do not meet or exceed a threshold level of interaction with the vehicle 106. By excluding objects that do not meet or exceed the threshold level of interaction with the vehicle 106, the simulation component can reduce an amount of computational resources required to generate the log-based representation of the environment 104 and/or to execute a driving simulation utilizing the log-based representation of the environment 104.

At operation 114, the simulation component may execute a driving simulation including a simulated autonomous vehicle traversing the representation of the environment 104. In some instances, an autonomous vehicle controller of the simulation component may control the simulated autonomous vehicle. Additionally, or alternatively, the simulated autonomous vehicle may include one or more simulated sensors. The simulated sensor(s) may generally correspond to and/or may employ any of the techniques associated with the sensor(s) of the vehicle 106, as previously described. In some examples, a configuration of one or more of the simulated sensors may correspond to a configuration of one or more of the sensors associated with the logging vehicle. Additionally, or alternatively, a configuration of one or more of the simulated sensors may not correspond to a configuration of one or more of the sensors associated with the logging vehicle (e.g., a corresponding real-world configuration of the sensors may be different). Additionally, or alternatively, the simulated sensors may be configured as multimodal simulated sensors capable of generating any one of lidar data, radar data, sonar data, time-of-flight data, image data, and/or any other depth data.

The driving simulation(s) may model normal and/or abnormal driving conditions and/or vehicle conditions, using a variety of simulated environments, objects, and/or agents. The driving simulations may model different traffic conditions, environmental conditions, roadway obstructions, accidents, etc., to test and validate passenger safety, vehicle routing, decision-making, efficiency, etc. Certain driving simulations may test the responses of the simulated vehicle to defective and/or faulty sensors on the vehicle. Certain driving simulations may test individual components or systems of the simulated vehicle (e.g., a sensor data perception component, a decision-making or planning component, etc.), while other driving simulations may test the simulated vehicle as a whole, including interactions between the various components or systems of the vehicle.

During the execution of a driving simulation, the simulation component may execute a set of simulation instructions to simulate a portion of the environment 104 similar to or identical to a corresponding portion of the environment 104 represented by the log data and/or by simulated agent model(s) that correspond to agents identified in the log data. In some cases, the simulation component may execute a simulation scenario which provides data representing the simulated environment and objects to the process(es) executing the vehicle controllers, which may respond by providing back to the process(es) executing the simulation scenario data representing the operations and behaviors of the simulated vehicle during the simulation.

At operation 116, the simulation component may receive simulated sensor data. In some instances, the simulated sensor data may represent characteristics, attributes, objects, entities, and/or agents associated with the simulated environment 118.

In some instances, the simulated sensor data may be generated by the simulated sensor(s) associated with the simulated vehicle 120 traversing the simulated environment 118. In some instances, the simulated sensor data may include simulated observed data 122 observed and/or perceived by the simulated vehicle 120, such as data identifying characteristics of the environment, entities and/or objects, such as, for example, a first simulated object 124 (e.g., a vehicle) in the simulated environment 118, corresponding to an object 112 represented by the log data and detected within the proximity of and/or within a point of view of the simulated vehicle 120.

In some instances, a second simulated object 126 (e.g., a cyclist) in the simulated environment 118, corresponding to an object 110 represented by the log data may be occluded from and/or outside of the proximity of the simulated vehicle 120 (e.g., object 126 occluded from point of view of simulated vehicle 120 by object 124), such that, the simulated observed data 122 may not detect the second simulated object 126.

For example, the simulated vehicle 120 may be at a simulated position in the simulated environment 118 that differs from a real-world position of the vehicle 106 traversing the environment 104, while a first simulated object 124 may be at a simulated position in the simulated environment 118 corresponding to the real-world position of the corresponding first object 112 in the environment 104, and the second simulated object 126 may be at a simulated position in the simulated environment 118 corresponding to the real-world position of the corresponding second object 110. Given the discrepancy in position between the real-world vehicle 106 and the simulated vehicle 120, one or more objects (e.g., second object 126) may be occluded by one or more additional objects (e.g., first object 124) in the simulated observed data 122 determined from the simulated sensor data, while the log data represents the corresponding object (e.g., object 110) not being occluded by an additional object (e.g., object 112), based on a discrepancy in point of view between the real world vehicle 106 and the simulated vehicle 120.

At the beginning of a driving simulation, each of the simulated objects 124, 126 initially may be playback objects, such that they are configured to operate in accordance with corresponding objects represented in the log data previously collected within the non-simulated environment 104, and thus the playback objects 124, 126 in the simulation may behave in a manner similar or identical to the behavior of the corresponding objects 110, 112 within the log data. Additionally, or alternatively, an object component associated with the simulation component may access and/or maintain an object database (interchangeably referred to throughout as an "entity database") allowing the simulation component to make changes to objects and/or entities in the simulated environment 118 that correspond to objects and/or entities in the environment 104 recorded by the real-world vehicle 106.

For example, the object component may be configured to identify a simulated agent model corresponding to the type of a simulated object identified in the simulated environment 118 and interpolate and/or extrapolate a path of travel of the simulated object throughout the simulated environment 118 based on the simulated object model.

Further, the object component may be configured to change the color of a particular object (e.g., a vehicle) from white to black (or any other colors contemplated), and the simulated sensors may regenerate simulated sensor data, potentially resulting in less lidar returns from a black vehicle than the white vehicle and perception, prediction, and/or planning results may be reprocessed. Additionally, or alternatively, the object component may be configured to change the type of a particular object (e.g., from a cyclist to a car), resulting in changes to behavior and/or characteristics of the object, and the simulated sensors may regenerate simulated sensor data, potentially resulting in the new type of object moving at changed speed and/or occluding (or no longer occluding) additional objects.

In some instances, the simulated sensor data may be sent to the autonomous vehicle controller associated with the simulation component. Additionally, or alternatively, the autonomous vehicle controller may comprise at least one of, but not limited to, a perception component, a prediction component, and/or a planning component.

The simulated vehicle 120 traversing the simulated environment 118 in the driving simulation may operate different from the vehicle 106 that collected the log data associated with the non-simulated environment 104. In some instances, a perception component, processing component, and/or a planning component of the vehicle controller may process such simulated sensor data to identify simulated objects 124, 126 in the simulated environment 118 from a point of view (e.g., the simulated observed data 122) of the simulated vehicle 120, thus generating highly accurate occlusion calculations for the simulated vehicle 120 (e.g., the first object 124 occluding the second object 126 from the point of view of the simulated vehicle 120), and differing from those represented by the log data captured by the vehicle 106 traversing the non-simulated environment 104. Processing the simulated sensor data in such a manner may allow the vehicle controller to determine a trajectory of the simulated vehicle 120 and/or react to objects and/or events detected by the simulated sensor data and from the point of view (e.g., the simulated observed data 122) represented by the sensor data generated by the simulated sensor of the simulated vehicle 120.

At operation 128, the autonomous vehicle controller associated with the simulation component may determine a trajectory of the simulated vehicle 120. As previously mentioned, the trajectory of the simulated vehicle 120 may be determined based on the simulated sensor data generated by the simulated sensor of the simulated vehicle 120 traversing the simulated environment 118. Additionally, or alternatively, the trajectory of the simulated vehicle may be determined based on processing results generated by at least one of a perception component, processing component, and/or a planning component of the vehicle controller may process such simulated sensor data to identify simulated objects 124, 126 in the simulated environment 118 from a point of view (e.g., the simulated observed data 122) of the simulated vehicle 120, thus generating highly accurate occlusion calculations for the simulated vehicle 120 (e.g., the first object 124 occluding the second object 126 from the point of view of the simulated vehicle 120), and differing from those represented by the log data captured by the vehicle 106 traversing the non-simulated environment 104.

The simulation component may perform the determination at operation 128 periodically and/or continuously during the execution of the simulation. Additionally, or alternatively, the trajectory of the simulated vehicle 120 may be based entirely and/or partly on simulated models associated with objects and/or entities in the simulated environment 118. Such simulated models may partly and/or entirely diverge from one or more trajectories of corresponding objects represented by the log data.

Figure 2A:
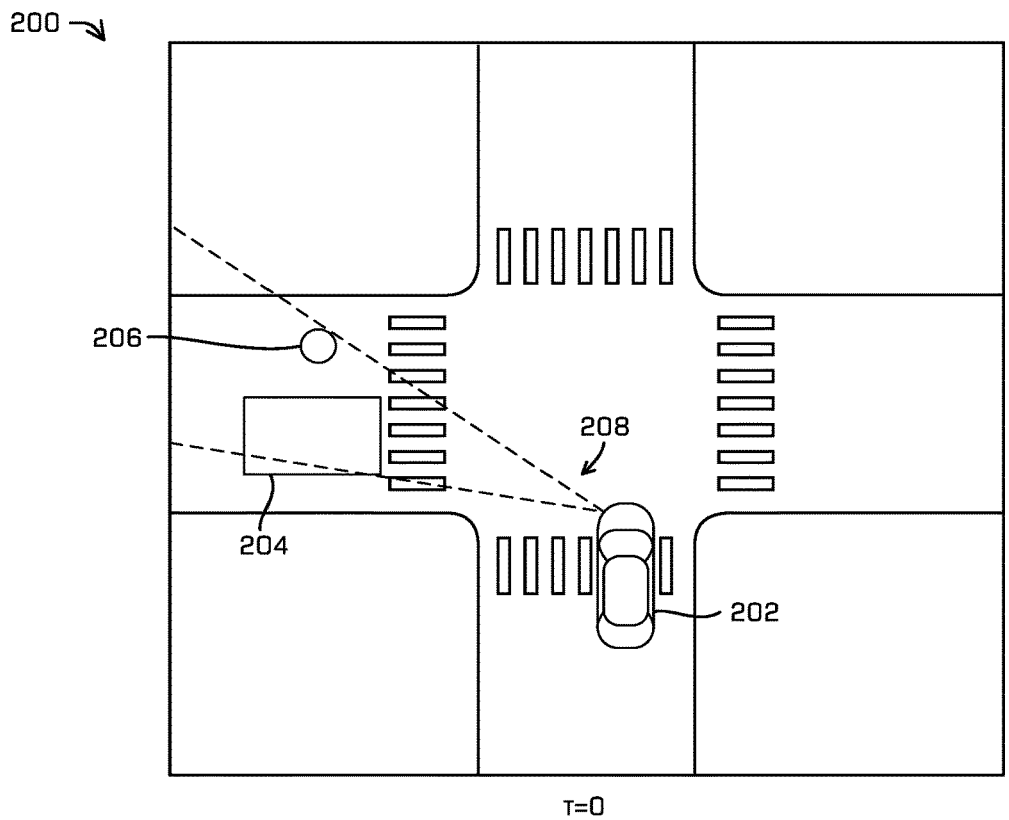
FIGS. 2A and 2B collectively illustrate example environments in which a simulated autonomous vehicle traversing a three-dimensional representation of an environment may perceive objects differently from a first perspective than a vehicle traversing an environment perceives objects from a second perspective at the same point in time.
Figure 2B:
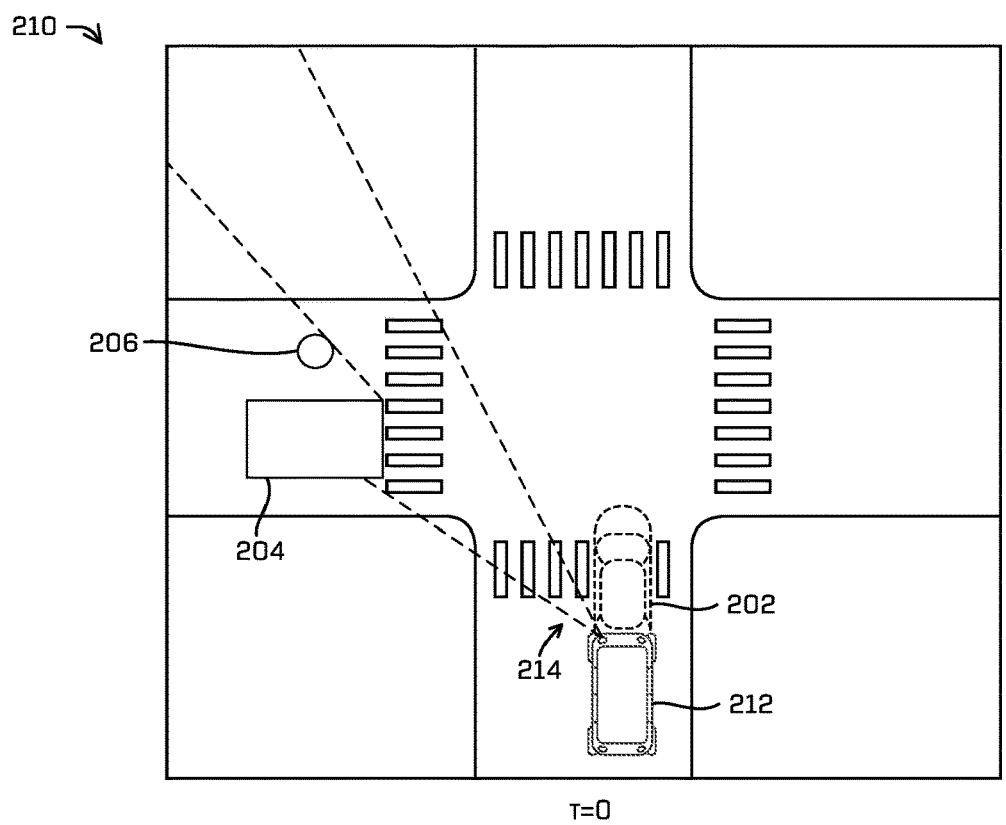

FIGS. 2A and 2B collectively illustrate example environments 200, 210 in which a sensor associated with a vehicle 202 traversing an environment 200 at a point in time (t=0) may perceive objects 204, 206 from a point of view (or perspective) 208 differently than a simulated sensor of simulated autonomous vehicle 212 traversing a simulated environment 210 corresponding to the environment 200 may perceive objects 204, 206 from a simulated point of view (or simulated perspective) 214 at the same point in time (t=0). That is, the simulated point of view may correspond to second point of view that is different from a first point of view of the sensor associated with the vehicle traversing the environment.

As illustrated, FIG. 2A includes an example snapshot at a point in time (t=0) depicting the real-world vehicle 202 (e.g., log vehicle) traversing the environment 200. In this example, the environment 200 includes a first object 204 (e.g., a vehicle) and a second object 206 (e.g., a cyclist) at respective positions in the environment 200. The real-world vehicle 202 may generate log data representing the environment 200 and any characteristics, attributes, objects, entities, and the like included in the environment 200. In some examples, objects 204, 206 in the environment 200 may be represented in a portion of the log data occurring at the point in time (t=0) based on a perspective 208 of the vehicle 202. For instance, the first object 204 and/or 206 may be included in the perspective 208 of the vehicle 202, and thus represented in the log data.

Additionally, as illustrated, FIG. 2B includes an example snapshot at a simulated point in time corresponding to the point in time (t=0) depicting the simulated vehicle 212 traversing the simulated environment 210. In some examples, the simulated environment 210 may be generated based on the log data collected by the vehicle 202 traversing the real-world environment 200 and may correspond to the real-world environment 200. For example, the simulated environment includes simulated variants of the first object 204 (e.g., a vehicle) and the second object 206 (e.g., a cyclist) at respective positions in the simulated environment 210 that correspond to the respective positions in the real-world environment 200. The simulated vehicle 212 may traverse the simulated environment 210 and generate simulated sensor data using a simulated sensor associated with the simulated vehicle 212. In some examples, objects 204, 206 in the simulated environment 210 may be represented in a portion of the simulated sensor data at the simulated point in time (t=0) based on a simulated perspective 214 of the simulated vehicle 212. For instance, the first object 204 may be included in the simulated perspective 214. Meanwhile, the second object 206 may be occluded by the first object 204 from the view of the simulated vehicle 212 at the simulated perspective 214.

Figure 3A:
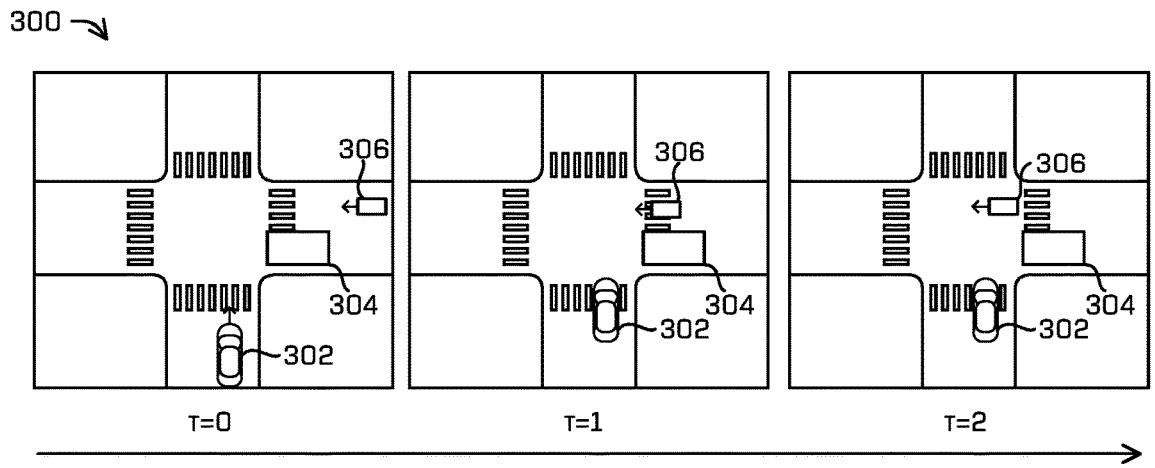
FIG. 3A illustrates an example environment with a vehicle traversing the environment over a period of time and collecting log data.

FIG. 3A illustrates an example environment 300 with a real-world vehicle 302 traversing the environment 300 over a period of time (t=0 through t=2) and collecting log data.

As illustrated, the environment 300 includes a vehicle 302, a static object 304, and an object in motion 306. As the vehicle 302 traverses the environment 300, the vehicle may collect log data representing various characteristics, attributes, objects, entities, events, and the like, associated with the environment 300.

At "t=0," the real-world vehicle 302 may be in motion according to a trajectory. In some instances, the object in motion 306 may have a path of travel that will intersect with a trajectory of a real-world vehicle 302 at a point in time (e.g., around t=2). In some instances, the object in motion 306 may be occluded from and/or out of range of the real-world vehicle 302.

At "t=1," a vehicle operator onboard the real-world vehicle 302 may notice the object in motion 306 and take over control to stop the vehicle 302 and avoid a potential collision. In some instances, the log data may represent a disengagement event.

At "t=2," the object in motion 306 may traverse beyond the trajectory of the real-world vehicle 302, avoiding a potential collision based on the disengagement event by the vehicle operator.

The log data collected by the real-world vehicle 302 may only represent the disengagement event, and may not include a representation of the object in motion 306. During execution of a log-based driving simulation (e.g., depicted by FIG. 3B), this may cause a simulated vehicle to traverse beyond the disengagement event unaware of the object in motion 306.

Figure 3B:
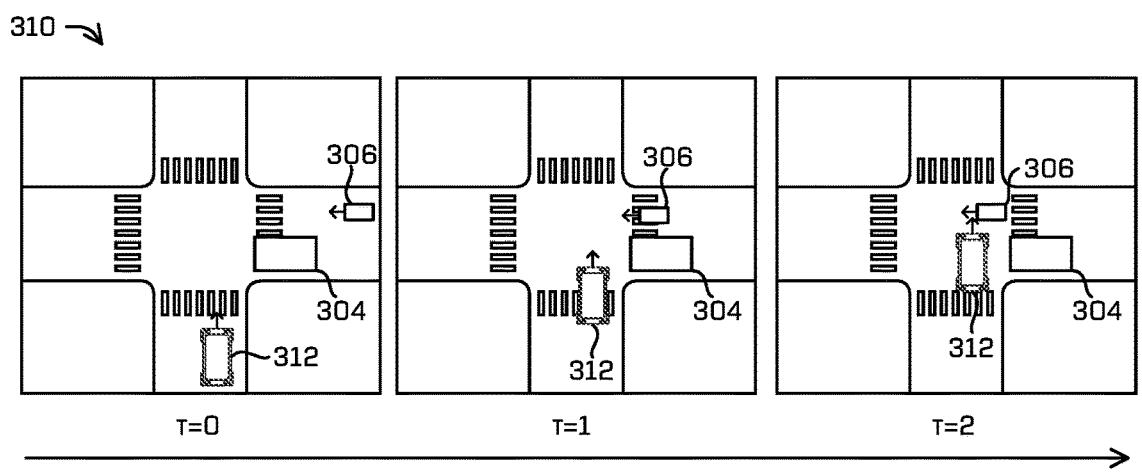
FIG. 3B illustrates an example three-dimensional representation of an environment generated based on log data and a driving simulation associated with an autonomous vehicle traversing the three-dimensional representation of the environment over a period of time under the control of an autonomous vehicle controller and based on log data.

FIG. 3B illustrates an example simulated representation of an environment 310 (e.g., a simulated environment) generated based on log data and a driving simulation associated with a simulated vehicle 312 traversing the simulated environment 310 over a period of time (t=0 through t=2) under the control of an autonomous vehicle controller and based on log data.

As illustrated, the simulated environment 310 includes a simulated vehicle 312, a static object 304, and an object in motion 306. The simulated vehicle 312 may be configured to traverse the simulated environment 310 and/or react to objects based at least in part on log data collected by the vehicle 302 in FIG. 3A.

At "t=0," the simulated vehicle 312 may be in motion according to a trajectory based on the log data collected by the vehicle 302 in FIG. 3A. In some instances, the object in motion 306 may have a path of travel that will intersect with a trajectory of the simulated vehicle 312 at a point in time (e.g., around t=2). In some instances, the log data may not represent the object in motion 306 due to the object in motion 306 being occluded from and/or out of range of the real-world vehicle 302 at the time the log data was collected.

At "t=1," the simulated vehicle 312 may continue in motion according to the trajectory beyond the disengagement event, as described with respect to FIG. 3A, and based on the log data. In some instances, the object in motion 306 may continue the path of travel toward intersection of the trajectory of the simulated vehicle 312.

At "t=2," the simulated vehicle 312 may continue in motion according to the trajectory based on the log data. In some instances, the object in motion 306 may continue the path of travel intersecting with the trajectory of the simulated vehicle 312, potentially resulting in a collision. Given that the log data does not include a representation of the object in motion 306, a vehicle controller utilizing the log data to control the simulated vehicle 312 does not have any indication of the object in motion 306.

Figure 3C:
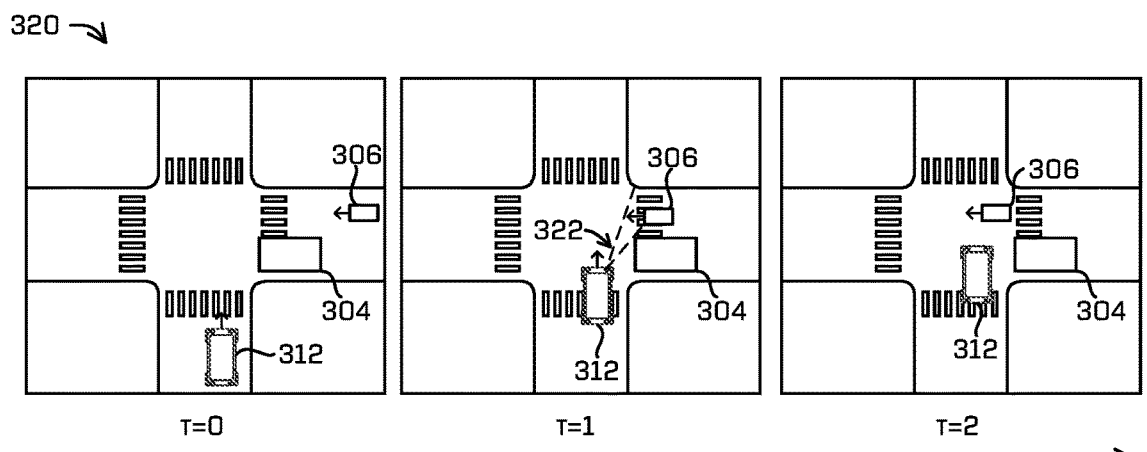
FIG. 3C illustrates an example three-dimensional representation of an environment generated based on log data and a driving simulation associated with an autonomous vehicle traversing the three-dimensional representation of the environment over a period of time under the control of an autonomous vehicle controller and based on simulated sensor data.

FIG. 3C illustrates an example simulated representation of an environment 320 (e.g., a simulated environment) generated based on log data and a driving simulation associated with an autonomous vehicle 312 traversing the simulated environment 320 over a period of time (t=0 through t=2) under the control of an autonomous vehicle controller and based on simulated sensor data.

As illustrated, the simulated environment 310 includes a simulated vehicle 312, a static object 304, and an object in motion 306. The simulated vehicle 312 may be configured to traverse the simulated environment 310 and/or react to objects based at least in part on simulated sensor data 322 collected by a simulated sensor associated with the simulated vehicle 312.

At "t=0," the simulated vehicle 312 may be in motion according to a trajectory generated by a vehicle controller and based on simulated sensor data 322 generated by a simulated sensor of the simulated vehicle 312 and/or log data collected by the vehicle 302 as described with respect to FIG. 3A. In some instances, the object in motion 306 may have a path of travel that will intersect with a trajectory of the simulated vehicle 312 at a point in time (e.g., around t=2). In some instances, the log data may not represent the object in motion 306 due to the object in motion 306 being occluded from and/or out of range of the real-world vehicle 302 at the time the log data was collected.

At "t=1," the simulated vehicle 312 may continue in motion according to the trajectory beyond the disengagement event, as described with respect to FIG. 3A. In some instances, the object in motion 306 may continue the path of travel toward intersection of the trajectory of the simulated vehicle 312. In some instances, the object in motion 306 may no longer be occluded by the static object 304, and the simulated sensor data 322 associated with the simulated vehicle 312 may represent the object in motion. The simulated sensor data 322 may be sent to the autonomous vehicle controller for processing.

At "t=2," the vehicle controller may cause the simulated vehicle 312 to stop and/or alter its trajectory, based on the sensor data 322 representing the object in motion 306 at "t=1," avoiding a potential collision. In some instances, the object in motion 306 may traverse beyond the trajectory of the simulated vehicle 312 without a resulting collision. In contrast, the log-based vehicle controller did not cause the simulated vehicle 312 as described with respect to FIG. 3B to stop and/or alter its trajectory as the log data did not represent the object in motion 306, and instead merely represented the disengagement event.

Figure 4B:
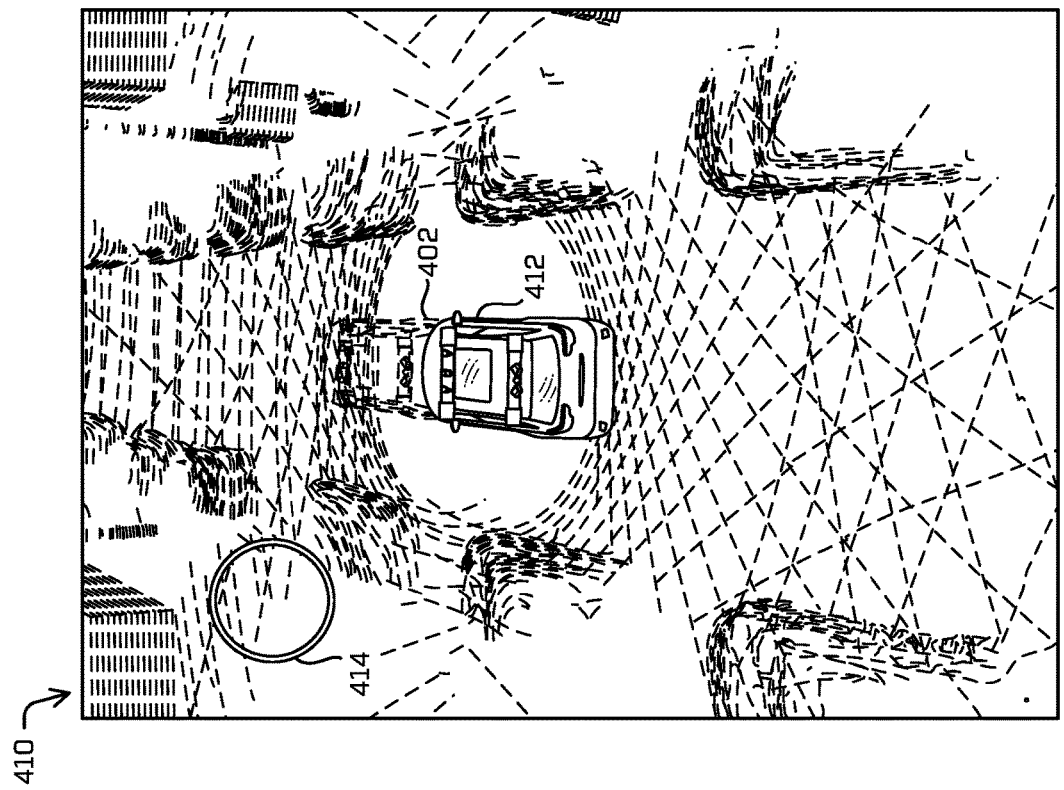
FIGS. 4A and 4B collectively illustrate an example simulation environment representing occlusion differences from sensors at different points of view at the same corresponding point in time.
Figure 4A:
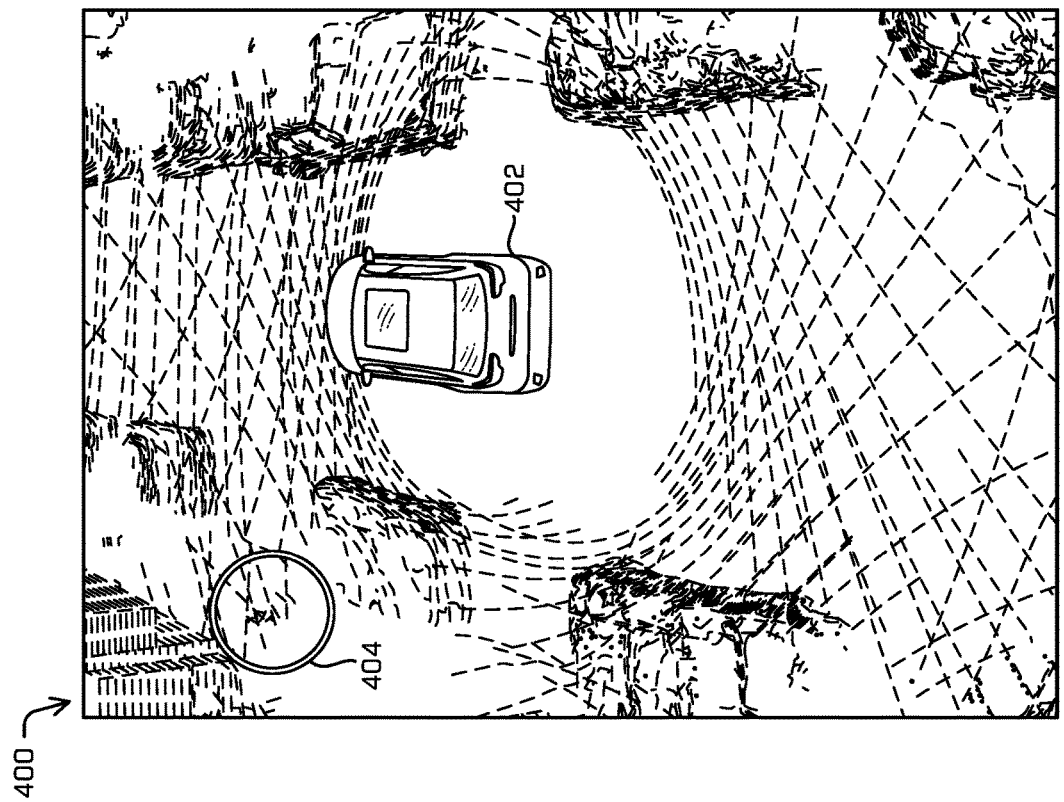

FIGS. 4A and 4B collectively illustrate example environments 400, 410 representing occlusion differences between log data and a simulated sensor at different points of view at the same point in time (e.g., t=0). The log data and/or the simulated sensor data may be generated using any of the techniques described above with respect to FIGS. 1-3C.

As illustrated, FIG. 4A includes an example snapshot of log data at a point in time (t=0) collected by the real-world vehicle 402 (e.g., log vehicle) traversing the environment 400. The real-world vehicle 402 may generate log data representing the environment 400 and any characteristics, attributes, objects, entities, events, and the like included in the environment 400. In this example, the environment 400 includes an object 404 (e.g., a pedestrian).

As illustrated, FIG. 4B includes an example snapshot of simulated sensor data at a point in time (t=0) generated by a simulated sensor associated with a simulated vehicle 412 traversing the simulated environment 410. The simulated sensor may generate simulated sensor data representing the simulated environment 410 and any characteristics, attributes, objects, entities, events, and the like included in the simulated environment 410. In this example, the simulated environment 410 represents an occluded position 414 corresponding to the object 404 included in the log data of the environment 400.

Figure 5:
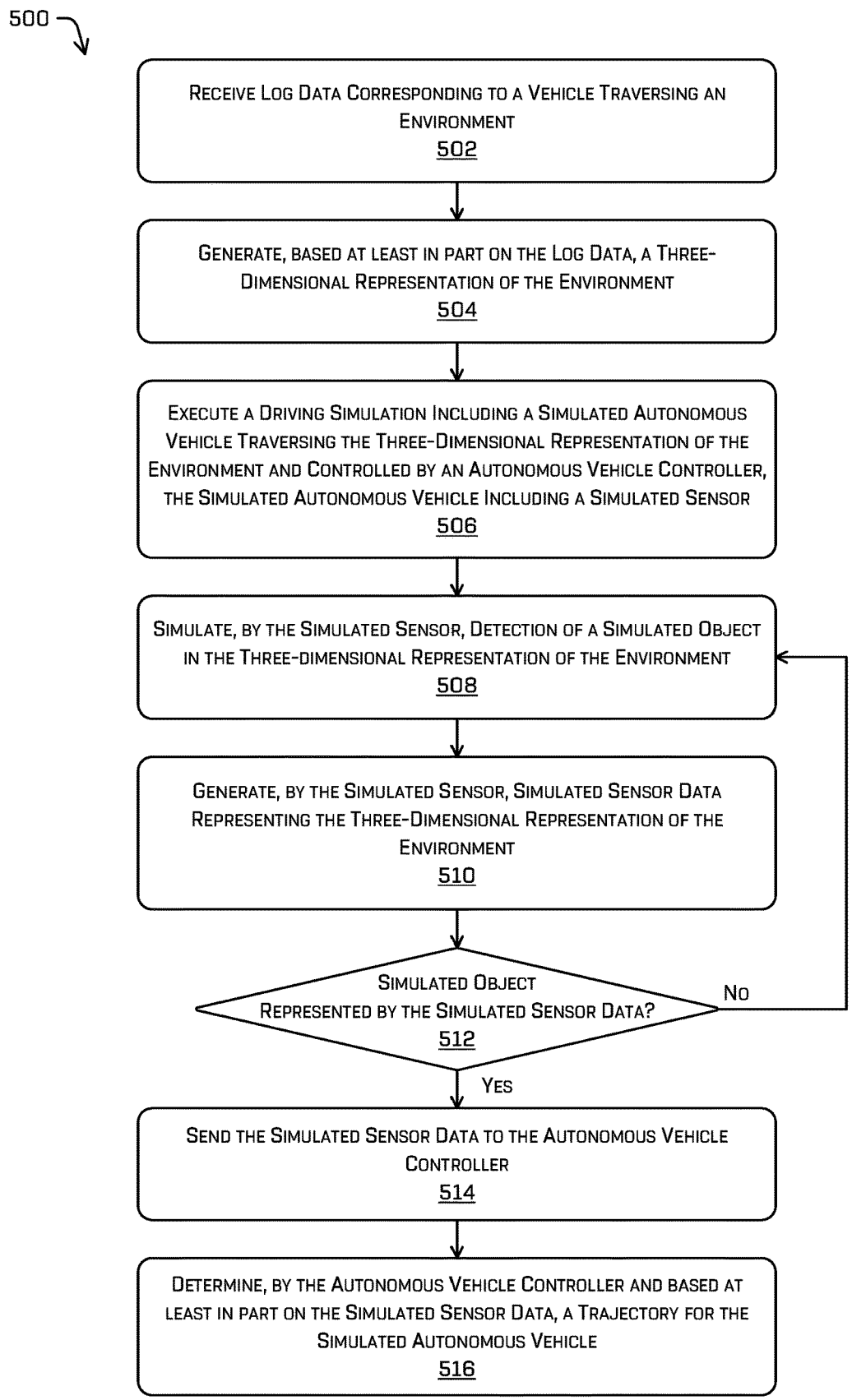
FIG. 5 is a flowchart illustrating an example method for generating a three-dimensional representation of an environment based on log data associated with a vehicle traversing the environment and executing driving simulations including a simulated autonomous vehicle having simulated sensors to determine a trajectory for the simulated vehicle based on the simulated sensor data.

FIG. 5 is a flowchart showing an example method for controlling a simulated autonomous vehicle based on simulated sensor data. The method illustrated in FIG. 5 is described with reference to one or more vehicles and/or systems described in FIGS. 1-4 and 6 for convenience and ease of understanding. However, the method illustrated in FIG. 5 is not limited to being performed using the vehicles, systems, and/or techniques described in FIGS. 1-4 and 6, and may be implemented using any of the other vehicles, systems, and technologies described in this application, as well as vehicles, systems, and technologies other than those described herein. Moreover, the vehicles, systems, and user interfaces described herein are not limited to performing the method illustrated in FIG. 5.

The method 500 is illustrated as a collection of blocks in logical flow graphs, which represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process may be omitted entirely.

FIG. 5 is a flowchart illustrating an example method 500 for generating a three-dimensional representation of an environment based on log data associated with a vehicle traversing the environment and executing driving simulations including a simulated autonomous vehicle having simulated sensors to determine a trajectory for the simulated vehicle based on the simulated sensor data.

The method 500 begins at operation 502 and includes receiving log data from a vehicle traversing an environment. In some examples, the computing device(s) 632 and/or the log data component 638 as described with respect to FIG. 6 may be configured to receive the log data. In some examples, vehicle may be configured as the vehicle 106 and/or may employ and of the techniques associated with the vehicle 106 as described with respect to FIG. 1.

At operation 504, the method 500 includes generating a three-dimensional representation of the environment. In some examples, the three-dimensional representation of the environment may be based at least in part on the log data. Additionally, or alternatively, the three-dimensional representation of the environment may be configured as the simulated environment as described herein.

At operation 506, the method 500 includes executing a driving simulation including a simulated autonomous vehicle traversing the three-dimensional representation of the environment. In some examples, the simulated autonomous vehicle may be controlled by an autonomous vehicle controller. Additionally, or alternatively, the simulated autonomous vehicle may include a simulated sensor. Additionally, or alternatively, the autonomous vehicle controller may comprise one or more of a perception component, a prediction component, and/or a planning component. In some examples, the simulated autonomous vehicle may be configured as the simulated vehicle 120 as described with respect to FIG. 1.

At operation 508, the method 500 includes simulating detection of a simulated object in the three-dimensional representation of the environment. In some examples, the detection of the simulated object may be simulated by the simulated sensor in accordance with any of the techniques described herein with respect to FIGS. 1-4B.

At operation 510, the method 500 includes generating simulated sensor data representing the three-dimensional representation of the environment. In some examples, the simulated sensor data may represent a simulated object in the three-dimensional representation of the environment. In some examples, the simulated sensor data may be generated by the simulated sensor. Additionally, or alternatively, the simulated sensor data may be generated by the simulated sensor in accordance with any of the techniques described herein with respect to FIGS. 1-4B.

At operation 512, the method 500 includes determining if a simulated object is represented by the simulated sensor data. By way of example, the operation 512 may include determining that a simulated object is represented by the simulated sensor data. By way of another example, the operation 512 may include determining that a simulated object is not represented by the simulated sensor data. The process may subsequently include the operation 508 to restart a portion of the process, based on determining that a simulated object is not represented by the simulated sensor data.

At operation 514, the method 500 includes sending the simulated sensor data to the autonomous vehicle controller.

At operation 516, the method 500 includes determining a trajectory of the simulated autonomous vehicle. In some examples, the trajectory of the simulated autonomous vehicle may be determined by the autonomous vehicle controller. Additionally, or alternatively, the trajectory of the simulated autonomous vehicle may be determined based at least in part on the simulated sensor data.

Figure 6:
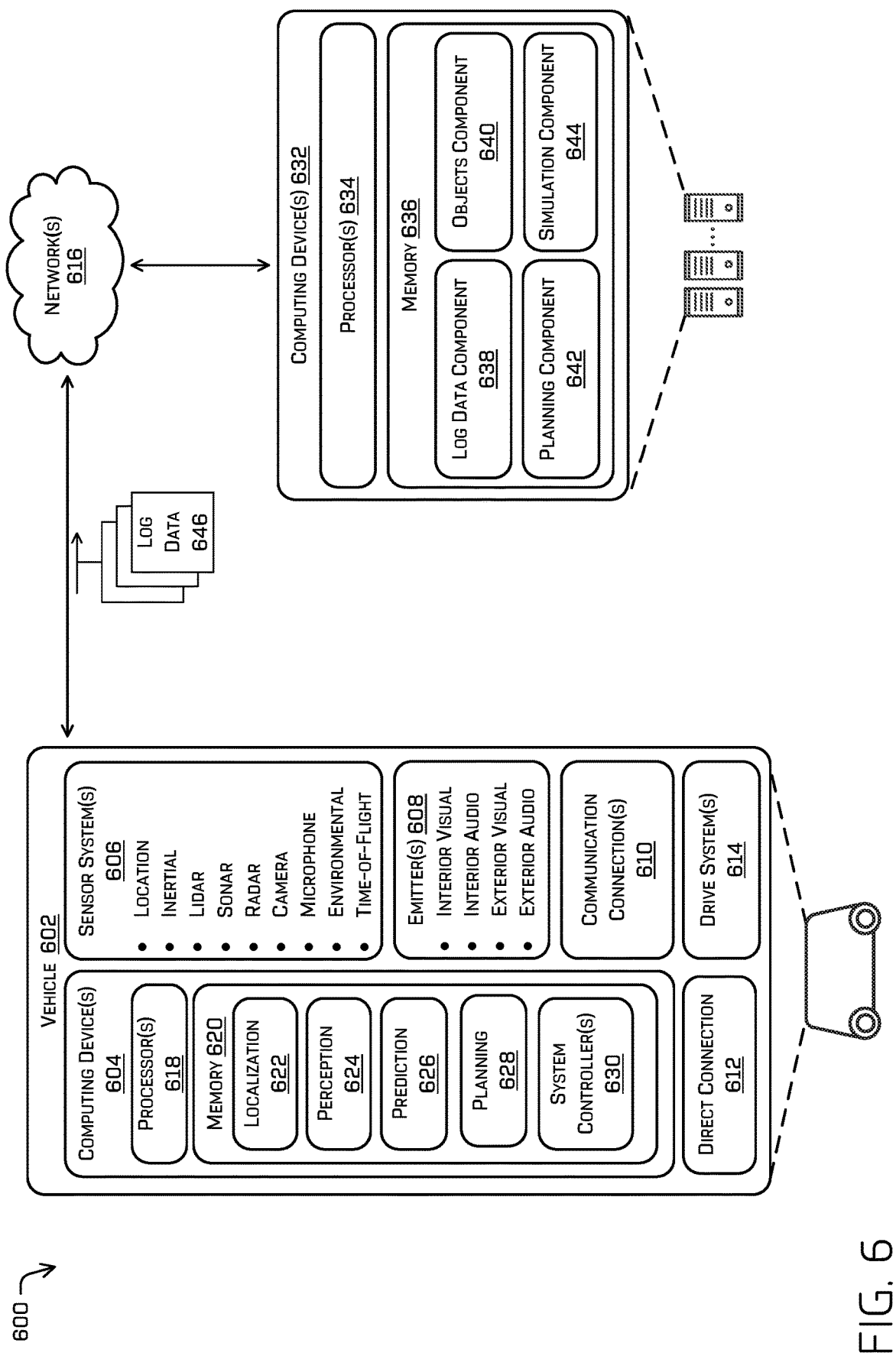
FIG. 6 is a block diagram illustrating an example system for implementing some of the various technologies described herein.

FIG. 6 is a block diagram illustrating an example system 600 for implementing some of the various technologies described herein. In at least one example, the example system 600 may include a vehicle 602, which can be similar to the vehicle(s) 106 and/or 120 described above with reference to FIGS. 1-5. In the illustrated example system 600, the vehicle 602 is an autonomous vehicle; however, the vehicle 602 may be any other type of vehicle.

The vehicle 602 may be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 602 may be configured to control all functions from start to completion of the trip, including all parking functions, it may not include a driver and/or controls for driving the vehicle 602, such as a steering wheel, an acceleration pedal, and/or a brake pedal. This is merely an example, and the systems and methods described herein may be incorporated into any ground-borne, airborne, or water-borne vehicle, including those ranging from vehicles that need to be manually controlled by a driver at all times, to those that are partially or fully autonomously controlled.

The vehicle 602 may be any configuration of vehicle, such as, for example, a van, a sport utility vehicle, a cross-over vehicle, a truck, a bus, an agricultural vehicle, and/or a construction vehicle. The vehicle 602 may be powered by one or more internal combustion engines, one or more electric motors, hydrogen power, any combination thereof, and/or any other suitable power sources. Although the vehicle 602 has four wheels, the systems and methods described herein may be incorporated into vehicles having fewer or a greater number of wheels, and/or tires. The vehicle 602 may have four-wheel steering and may operate generally with equal or similar performance characteristics in all directions, for example, such that a first end of the vehicle 602 is the front end of the vehicle 602 when traveling in a first direction, and such that the first end becomes the rear end of the vehicle 602 when traveling in the opposite direction. Similarly, a second end of the vehicle 602 is the front end of the vehicle when traveling in the second direction, and such that the second end becomes the rear end of the vehicle 602 when traveling in the opposite direction. These example characteristics may facilitate greater maneuverability, for example, in small spaces or crowded environments, such as parking lots and/or urban areas.

The vehicle 602 may include a computing device(s) 604, one or more sensor system(s) 606, one or more emitter(s) 608, one or more communication connection(s) 610 (also referred to as communication devices and/or modems), at least one direct connection 612 (e.g., for physically coupling with the vehicle 602 to exchange data and/or to provide power), and one or more drive system(s) 614. The one or more sensor system(s) 606 may be configured to capture sensor data associated with an environment.

The sensor system(s) 606 may include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 may include multiple instances of each of these or other types of sensors. For instance, the time-of-flight sensors may include individual time-of-flight sensors located at the corners, front, back, sides, and/or top of the vehicle 602. As another example, the camera sensors may include multiple cameras disposed at various locations about the exterior and/or interior of the vehicle 602. The sensor system(s) 606 may provide input to the computing device(s) 604.

The vehicle 602 may also include one or more emitter(s) 608 for emitting light and/or sound. The one or more emitter(s) 608 in this example include interior audio and visual emitters to communicate with passengers of the vehicle 602. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The one or more emitter(s) 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 may also include one or more communication connection(s) 610 that enable communication between the vehicle 602 and one or more other local or remote computing device(s) (e.g., a remote teleoperations computing device) or remote services. For instance, the communication connection(s) 610 may facilitate communication with other local computing device(s) on the vehicle 602 and/or the drive system(s) 614. Also, the communication connection(s) 610 may allow the vehicle 602 to communicate with other nearby computing device(s) (e.g., other nearby vehicles, traffic signals, etc.).

The communications connection(s) 610 may include physical and/or logical interfaces for connecting the computing device(s) 604 to another computing device or one or more external networks 616 (e.g., the Internet). For example, the communications connection(s) 610 may enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.), satellite communication, dedicated short-range communications (DSRC), or any suitable wired or wireless communications protocol that enables the respective computing device to interface with the other computing device(s).

In at least one example, the vehicle 602 may include one or more drive system(s) 614. In some examples, the vehicle 602 may have a single drive system 614. In at least one example, if the vehicle 602 has multiple drive systems 614, individual drive systems 614 may be positioned on opposite ends of the vehicle 602 (e.g., the front and the rear, etc.). In at least one example, the drive system(s) 614 may include one or more sensor system(s) 606 to detect conditions of the drive system(s) 614 and/or the surroundings of the vehicle 602. By way of example and not limitation, the sensor system(s) 606 may include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders may be unique to the drive system(s) 614. In some cases, the sensor system(s) 606 on the drive system(s) 614 may overlap or supplement corresponding systems of the vehicle 602 (e.g., sensor system(s) 606).

The drive system(s) 614 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, ahigh voltage cable, charging system, charge port, etc.). Additionally, the drive system(s) 614 may include a drive system controller which may receive and preprocess data from the sensor system(s) 606 and to control operation of the various vehicle systems. In some examples, the drive system controller may include one or more processor(s) and memory communicatively coupled with the one or more processor(s). The memory may store one or more modules to perform various functionalities of the drive system(s) 614. Furthermore, the drive system(s) 614 also include one or more communication connection(s) that enable communication by the respective drive system with one or more other local or remote computing device(s).

The computing device(s) 604 may be similar to the vehicle computing device described above with reference to FIG. 1. The computing device(s) 604 may include one or more processor(s) 618 and memory 620 communicatively coupled with the one or more processor(s) 618. In the illustrated example, the memory 620 of the computing device(s) 604 stores a localization component 622, a perception component 624, a prediction component 626, a planning component 628, and one or more system controller(s) 630. Though depicted as residing in the memory 620 for illustrative purposes, it is contemplated that the localization component 622, the perception component 624, the prediction component 626, the planning component 628, and the one or more system controller(s) 630 may additionally, or alternatively, be accessible to the computing device(s) 604 (e.g., stored in a different component of vehicle 602 and/or be accessible to the vehicle 602 (e.g., stored remotely).

In the memory 620 of the computing device(s) 604, the localization component 622 may include functionality to receive data from the sensor system(s) 606 to determine a position of the vehicle 602. For example, the localization component 622 may include and/or request/receive a three-dimensional map of an environment and may continuously determine a location of the autonomous vehicle within the map. In some instances, the localization component 622 may use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some instances, the localization component 622 may provide data to various components of the vehicle 602 to determine an initial position of an autonomous vehicle for generating a trajectory, as discussed herein. In at least one example, the localization component 622 may determine a location of a simulated vehicle within a simulated environment and/or determine a closest prior location of a vehicle that recorded log data of which the simulated environment is based on.

The perception component 624 may include functionality to perform object detection, segmentation, and/or classification. In some examples, the perception component 624 may provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional and/or alternative examples, the perception component 624 may provide processed sensor data that indicates one or more characteristics associated with a detected entity and/or the environment in which the entity is positioned. In some examples, characteristics associated with an entity may include, but are not limited to, an x-position (global position), a y-position (global position), a z-position (global position), an orientation, an entity type (e.g., a classification), a velocity of the entity, an extent of the entity (size), etc. Characteristics associated with the environment may include, but are not limited to, a presence of another entity in the environment, a state of another entity in the environment, a time of day, a day of a week, a season, a weather condition, an indication of darkness/light, etc. In at least one example, the perception component 624 may generate log data associated with a vehicle traversing an environment, as described herein. The log data may then be used to, among other things, generate a simulated scenario including a simulated environment for testing a vehicle.

The perception component 624 may include functionality to store perception data generated by the perception component 624. In some instances, the perception component 624 may determine a track corresponding to an object that has been classified as an object type. For purposes of illustration only, the perception component 624, using sensor system(s) 606 may capture one or more images of an environment. The sensor system(s) 606 may capture images of an environment that includes an object, such as a building, vehicle, trees, streetlights, pedestrians, etc.

The stored perception data may, in some examples, include fused perception data captured by the vehicle. Fused perception data may include a fusion or other combination of sensor data from sensor system(s) 606, such as image sensors, lidar sensors, radar sensors, time-of-flight sensors, sonar sensors, global positioning system sensors, internal sensors, and/or any combination of these. The stored perception data may additionally or alternatively include classification data including semantic classifications of objects (e.g., pedestrians, vehicles, buildings, road surfaces, etc.) represented in the sensor data.

The prediction component 626 may generate one or more probability maps representing prediction probabilities of possible locations of one or more objects in an environment. For example, the prediction component 626 may generate one or more probability maps for vehicles, pedestrians, animals, and the like within a threshold distance from the vehicle 602. In some instances, the prediction component 626 may measure a track of an object and generate a discretized prediction probability map, a heat map, a probability distribution, a discretized probability distribution, and/or a trajectory for the object based on observed and predicted behavior. In some instances, the one or more probability maps may represent an intent of the one or more objects in the environment.

The planning component 628 may determine a path for the vehicle 602 to follow to traverse through an environment. For example, the planning component 628 may determine various routes and paths and various levels of detail. In some instances, the planning component 628 may determine a route to travel from a first location (e.g., a current location) to a second location (e.g., a target location). For the purpose of this discussion, a route may be a sequence of waypoints for traveling between two locations. As non-limiting examples, waypoints include streets, intersections, global positioning system (GPS) coordinates, etc. Further, the planning component 628 may generate an instruction for guiding the autonomous vehicle along at least a portion of the route from the first location to the second location. In at least one example, the planning component 628 may determine how to guide the autonomous vehicle from a first waypoint in the sequence of waypoints to a second waypoint in the sequence of waypoints. In some examples, the instruction may be a path, or a portion of a path. In some examples, multiple paths may be substantially simultaneously generated (i.e., within technical tolerances) in accordance with a receding horizon technique. A single path of the multiple paths in a receding data horizon having the highest confidence level may be selected to operate the vehicle.

In other examples, the planning component 628 may alternatively, or additionally, use data from the perception component 624 to determine a path for the vehicle 602 to follow to traverse through an environment. For example, the planning component 628 may receive data from the perception component 624 regarding objects associated with an environment. Using this data, the planning component 628 may determine a route to travel from a first location (e.g., a current location) to a second location (e.g., a target location) to avoid objects in an environment. In at least some examples, such a planning component 628 may determine there is no such collision free path and, in turn, provide a path which brings vehicle 602 to a safe stop avoiding all collisions and/or otherwise mitigating damage.

In at least one example, the computing device(s) 604 may include one or more system controller(s) 630, which may be configured to control steering, propulsion, braking, safety, emitters, communication, and other systems of the vehicle 602. These system controller(s) 630 may communicate with and/or control corresponding systems of the drive system(s) 614 and/or other components of the vehicle 602, which may be configured to operate in accordance with a path provided from the planning component 628.

The vehicle 602 may connect to computing device(s) 632 via network(s) 616 and may include one or more processor(s) 634 and memory 636 communicatively coupled with the one or more processor(s) 634. In at least one instance, the one or more processor(s) 634 may be similar to the processor(s) 618 and the memory 636 may be similar to the memory 620. In the illustrated example, the memory 636 of the computing device(s) 632 stores a log data component 638, an objects component 640, a planning component 642, and a simulation component 644. Though depicted as residing in the memory 636 for illustrative purposes, it is contemplated that the log data component 638, the objects component 640, the planning component 642, and the simulation component 644 may additionally, or alternatively, be accessible to the computing device(s) 632 (e.g., stored in a different component of computing device(s) 632 and/or be accessible to the computing device(s) 632 (e.g., stored remotely).

In the memory 636 of the computing device(s) 632, the log data component 638 may determine log data to be used for generating a simulated environment. As discussed above, a database may store one or more log data. In some instances, the computing device(s) 632 may act as the database to store the log data. In some instances, the computing device(s) 632 may connect to a different computing device to access the log data database. The log data component 638 may scan log data stored in the database and identify log data that contains an attribute, characteristic, object, entity, event, and/or the like, associated with an environment.

Additionally, the objects component 640 may identify one or more objects associated with the log data. For example, the objects component 640 may determine objects such as vehicles, pedestrians, animals, cyclists, trees, buildings, streetlights, barriers, fences, etc. in the log data and represented as simulated objects. In some instances, the objects component 640 may determine objects that interact with the vehicle associated with the log data. In some examples, the objects component 640 may determine attributes associated with an object. For example, an attribute may include an object extent (also referred to as an object size, which may represent a length, width, height, and/or volume), an object classification, an object pose, an object trajectory, an object waypoint, an object instantiation attribute, and/or an object termination attribute.

An object extent may indicate a size and/or volume of the object (e.g., a length of 5 meters). The object classification may indicate a classification and/or type of the object (e.g., a vehicle, a pedestrian, a bicyclist, etc.). The object pose may indicate an object's x-y-z coordinates (e.g., a position or position data) in the environment and/or may include a pitch, a roll, and/or a yaw associated with the object. The object trajectory may indicate a trajectory followed by the object. The object waypoint may indicate a position in the environment that indicates a route between two locations.

The object instantiation attribute may indicate how the vehicle detected the object. For example, the object may enter a detection range of the vehicle by: (1) the vehicle approaching the object, (2) the object approaching the vehicle, and/or (3) the object becoming visible (unoccluded) or an occlusion cessation of the object. The object termination attribute may indicate how the vehicle may no longer detect the object. For example, the object may be in a position outside of the detection range of the vehicle by: (1) the vehicle moving away from the object, (2) the object moving away from the vehicle, and/or (3) the object becoming occluded or an occlusion of the object.

Additionally, or alternatively, the object component 640 may be configured for accurately testing various "what-if" scenarios and changes to situations observed by a real-world vehicle and/or represented by the log data. In some instances, the object component 640 may access and/or maintain an object database (interchangeably referred to throughout as an "entity database") allowing the simulation component 644 to make changes to objects and/or entities in the world recorded by the real-world vehicle. For example, the object component 640 may be configured to change the color of a particular object (e.g., a vehicle) from white to black (or any other colors contemplated), and the simulated sensors may regenerate simulated sensor data, potentially resulting in less lidar returns from a black vehicle than the white vehicle and perception, prediction, and/or planning results may be reprocessed. Additionally, or alternatively, the object component 640 may be configured to change the type of a particular object (e.g., from a cyclist to a car), resulting in changes to behavior and/or characteristics of the object, and the simulated sensors may regenerate simulated sensor data, potentially resulting in the new type of object moving at changed speed and/or occluding (or no longer occluding) additional objects.

Further, the object component 640 may be configured to identify a simulated agent model corresponding to the type of a simulated object identified in the simulated environment and interpolate and/or extrapolate a path of travel of the simulated object throughout the simulated environment based on the simulated agent model.

The planning component 642 may use the simulated sensor data, generated by a simulated sensor of a simulated vehicle during a driving simulation, to control a simulated autonomous vehicle. For example, the planning component 642 may identify an object in the simulated sensor data and generate a trajectory for the simulated vehicle based on identifying the object in the simulated sensor data. In some instances, the planning component 642 may use the perception data generated by the perception component 624 and/or the simulated object models retrieved by the objects component 640 to apply simulated object models to the simulated objects. For example, the planning component 642 may identify a simulated vehicle model and apply it to the simulated objects associated with vehicles. Additionally, or alternatively, the planning component 642 may interpolate and/or extrapolate a path of travel of the simulated object throughout the simulated environment based on the simulated agent model.

The simulation component 644 may execute a driving simulation as a set of simulation instructions and generate simulation data. In some instances, the simulation component 644 may execute multiple driving simulations simultaneously and/or in parallel. This may allow a user to edit a driving simulation and execute permutations of the driving simulation with variations between each driving simulation. The simulation component 644, in at least one example, tests a vehicle controller by providing the vehicle controller with simulated sensor data generated by a simulated sensor of a simulated vehicle traversing a simulated environment in the driving simulation.

Additionally, the simulation component 644 may determine an outcome for the driving simulation. For example, the simulation component 644 may execute the driving simulation for use in a simulation for testing and validation. The simulation component 644 generate the simulation data indicating how the autonomous controller performed (e.g., responded) and may compare the simulation data to a predetermined outcome, a log-based simulation, and/or determine if any predetermined rules/assertions were broken/triggered.

In some instances, the predetermined rules/assertions may be based on the driving simulation (e.g., traffic rules regarding crosswalks may be enabled based on a crosswalk scenario or traffic rules regarding crossing a lane marker may be disabled for a stalled vehicle scenario). In some instances, the simulation component 644 may enable and disable rules/assertions dynamically as the simulation progresses. For example, as a simulated object approaches a school zone, rules/assertions related to school zones may be enabled and disabled as the simulated object departs from the school zone. In some instances, the rules/assertions may include comfort metrics that relate to, for example, how quickly an object may accelerate given the simulated scenario.

Based at least in part on determining that the autonomous controller performed consistent with the predetermined outcome (that is, the autonomous controller did everything it was supposed to do), determining that a collision did not occur, and/or determining that a rule was not broken or an assertion was not triggered, the simulation component 644 may determine that the autonomous controller succeeded. Based at least in part on determining that the autonomous controller performance was inconsistent with the predetermined outcome (that is, the autonomous controller did something that it wasn't supposed to do), determining that a collision occurred, and/or determining that a rule was broken or than an assertion was triggered, the simulation component 644 may determine that the autonomous controller failed. Accordingly, based at least in part on executing a driving simulation, simulation data may indicate how the autonomous controller responds to objects represented by the simulated sensor data, as described above and determine a successful outcome or an unsuccessful outcome based at least in part on the simulation data.

The processor(s) 618 of the computing device(s) 604 and the processor(s) 634 of the computing device(s) 632 may be any suitable processor capable of executing instructions to process data and perform operations as described herein. By way of example and not limitation, the processor(s) 618 and 634 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

The memory 620 computing device(s) 604 and the memory 636 of the computing device(s) 632 are examples of non-transitory computer-readable media. The memory 620 and 636 may store an operating system and one or more software applications, instructions, programs, and/or data to implement the methods described herein and the functions attributed to the various systems. In various implementations, the memory 620 and 636 may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, aspects of some or all of the components discussed herein may include any models, algorithms, and/or machine learning algorithms. For example, in some instances, the components in the memory 620 and 636 may be implemented as a neural network.

Example Clauses

A. A system comprising: one or more processors; and one or more non-transitory computer-readable media storing instructions executable by one or more processors, wherein the instructions, when executed, cause the system to perform operations comprising: receiving log data corresponding to a vehicle traversing an environment; generating, based at least in part on the log data, a three-dimensional representation of the environment; executing a driving simulation including a simulated autonomous vehicle traversing the three-dimensional representation of the environment and controlled by an autonomous vehicle controller, wherein the simulated autonomous vehicle includes a simulated sensor, and wherein the autonomous vehicle controller comprises a perception component and a planning component; simulating, by the simulated sensor, detection of a simulated object in the three-dimensional representation of the environment; generating, by the simulated sensor, based on the detection of the simulated object, simulated sensor data representing the simulated object; sending the simulated sensor data to the autonomous vehicle controller; and determining, by the autonomous vehicle controller and based at least in part on the simulated sensor data, a trajectory of the simulated autonomous vehicle in the three-dimensional representation of the environment.

B. The system of paragraph A, wherein a portion of the log data represents a first point of view of a sensor associated with the vehicle traversing the environment at a first time, and the operations further comprise: generating the simulated sensor data at a simulation time corresponding to the first time and at a simulated point of view of the simulated sensor, the simulated point of view corresponding to a second point of view that is different from the first point of view.

C. The system of any one of paragraphs A or B, wherein: a portion of the log data represents additional object in the environment, the additional object being in view of a sensor associated with the vehicle traversing the environment at a first time; and the simulated sensor data indicates that an additional simulated object corresponding to the additional object is occluded by the simulated object in the three-dimensional representation of the environment at a simulation time corresponding to the first time.

D. The system of any one of paragraphs A-C, wherein: a portion of the log data represents additional object in the environment, the additional object being in view of a sensor associated with the vehicle traversing the environment at a first time; and the simulated sensor data indicates that an additional simulated object corresponding to the additional object is occluded by the simulated object in the three-dimensional representation of the environment at a simulation time corresponding to the first time.

E. The system of any one of paragraphs A-D, wherein: a portion of the log data represents an object at a location in the environment at a first time, the object being a first object type; and the simulated sensor data represents the simulated object at a simulated location in the three-dimensional representation of the environment at a simulated time corresponding to the first time, the simulated location corresponding to the location in the environment, and the simulated object being a second object type that is different from the first object type.

F. A method comprising: generating, based at least in part on log data corresponding to a vehicle traversing an environment, a three-dimensional representation of the environment; executing a driving simulation including a simulated autonomous vehicle traversing the three-dimensional representation of the environment and controlled by an autonomous vehicle controller, wherein the simulated autonomous vehicle includes a simulated sensor; generating, by the simulated sensor, simulated sensor data representing a simulated object in the three-dimensional representation of the environment; and determining, by the autonomous vehicle controller and based at least in part on the simulated sensor data, a trajectory of the simulated autonomous vehicle.

G. The method of paragraph F, wherein a portion of the log data represents a first point of view of a sensor associated with the vehicle traversing the environment at a first time, and the method further comprising: generating the simulated sensor data at a simulation time corresponding to the first time and at a simulated point of view of the simulated sensor, the simulated point of view corresponding to a second point of view that is different from the first point of view.

H. The method of any one of paragraphs F or G, wherein: a portion of the log data represents additional object in the environment, the additional object being in view of a sensor associated with the vehicle traversing the environment at a first time; and the simulated sensor data indicates that an additional simulated object corresponding to the additional object is occluded by the simulated object in the three-dimensional representation of the environment at a simulation time corresponding to the first time.

L. The method of any one of paragraphs F-H, wherein: a portion of the log data represents a disengagement event associated with the vehicle at a location in the environment and at a first time; and the driving simulation includes the simulated autonomous vehicle traversing past a second location in the three-dimensional representation of the environment corresponding to the location at a simulation time corresponding to the first time.

J. The method of any one of paragraphs F-I, wherein: a portion of the log data represents an object at a location in the environment at a first time, the object being a first object type; and the simulated sensor data represents the simulated object at a simulated location in the three-dimensional representation of the environment at a simulated time corresponding to the first time, the simulated location corresponding to the location in the environment, and the simulated object being a second object type that is different from the first object type.

K. The method of any one of paragraphs F-J, wherein a simulated configuration of the simulated sensor corresponds to a configuration of a sensor associated with the vehicle traversing the environment.

L. The method of any one of paragraphs F-K, further comprising: identifying an object in the environment represented by the log data and corresponding to the simulated object; identifying a first location of the object in the environment at a first time represented by the log data; identifying a second location of the object in the environment at a second time represented by the log data, the second time being subsequent to the first time; determining an object type of the object based at least in part on the log data; identifying a simulated vehicle model corresponding to the object type; and wherein the driving simulation includes interpolating a motion of the simulated object through the three-dimensional representation of the environment from a first simulated location corresponding to the first location and to a second simulated location corresponding to the second location based at least in part on the simulated vehicle model.

M. The method of paragraph L, wherein the driving simulation includes extrapolating the motion of the simulated object through the three-dimensional representation of the environment from the second simulated location to a third simulated location based at least in part on the simulated vehicle model.

N. The method of any one of paragraphs F-M, wherein the simulated sensor is a multimodal simulated sensor and the simulated sensor data comprises at least one of lidar data, radar data, sonar data, time-of-flight data, or image data.

O. One or more non-transitory computer-readable media storing instructions executable by a processor, wherein the instructions, when executed, cause the processor to perform operations comprising: generating, based at least in part on log data corresponding to a vehicle traversing an environment, a three-dimensional representation of the environment; executing a driving simulation including a simulated autonomous vehicle traversing the three-dimensional representation of the environment and controlled by an autonomous vehicle controller, wherein the simulated autonomous vehicle includes a simulated sensor; generating, by the simulated sensor, simulated sensor data representing a simulated object in the three-dimensional representation of the environment; and determining, by the autonomous vehicle controller and based at least in part on the simulated sensor data, a trajectory of the simulated autonomous vehicle.

P. The one or more non-transitory computer-readable media of paragraph O, wherein a portion of the log data represents a first point of view of a sensor associated with the vehicle traversing the environment at a first time, and the operations further comprise: generating the simulated sensor data at a simulation time corresponding to the first time and at a simulated point of view of the simulated sensor, the simulated point of view corresponding to a second point of view that is different from the first point of view.

Q. The one or more non-transitory computer-readable media of any one of paragraphs O or P, wherein: a portion of the log data represents additional object in the environment, the additional object being in view of a sensor associated with the vehicle traversing the environment at a first time; and the simulated sensor data indicates that an additional simulated object corresponding to the additional object is occluded by the simulated object in the three-dimensional representation of the environment at a simulation time corresponding to the first time.

R. The one or more non-transitory computer-readable media of any one of paragraphs O-Q, wherein: a portion of the log data represents a disengagement event associated with the vehicle at a location in the environment and at a first time; and the driving simulation includes the simulated autonomous vehicle traversing past a second location in the three-dimensional representation of the environment corresponding to the location at a simulation time corresponding to the first time.

S. The one or more non-transitory computer-readable media of any one of paragraphs O-R, wherein a simulated configuration of the simulated sensor is different from a configuration of a sensor associated with the vehicle traversing the environment.

T. The one or more non-transitory computer-readable media of any one of paragraphs O-S, the operations further comprising: identifying an object in the environment represented by the log data and corresponding to the simulated object; identifying a first location of the object in the environment at a first time represented by the log data; identifying a second location of the object in the environment at a second time represented by the log data, the second time being subsequent to the first time; determining an object type of the object based at least in part on the log data; identifying a simulated vehicle model corresponding to the object type; and wherein the driving simulation includes interpolating a motion of the simulated object through the three-dimensional representation of the environment from a first simulated location corresponding to the first location and to a second simulated location corresponding to the second location based at least in part on the simulated vehicle model.

While the example clauses described above are described with respect to one particular implementation, it should be understood that, in the context of this document, the content of the example clauses may also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving log data corresponding to a real-world vehicle traversing an environment, wherein a portion of the log data represents a first point of view of a sensor associated with the real-world vehicle traversing the environment at a first time, the portion of the log data representing a first object that is in view of the sensor associated with the real-world vehicle and a second object that is in view of the sensor associated with the real-world vehicle;
generating, based at least in part on the log data, a three-dimensional representation of the environment;
executing a driving simulation including a simulated autonomous vehicle traversing the three-dimensional representation of the environment and controlled by an autonomous vehicle controller, wherein the simulated autonomous vehicle includes a simulated sensor, and wherein the autonomous vehicle controller comprises a perception component and a planning component;
simulating a first simulated object and a second simulated object in the three-dimensional representation of the environment;
generating, by the simulated sensor, simulated sensor data at a simulation time corresponding to the first time and at a simulated point of view corresponding to a second point of view that is different than the first point of view of the sensor associated with the real-world vehicle, the simulated point of view not represented in the portion of the log data, the simulated sensor data indicating that the first simulated object is at least partially occluded by the second simulated object, wherein this occlusion is based at least in part on (i) a difference between a first position of the real-world vehicle represented in the log data and a second position of the simulated autonomous vehicle not represented in the log data and (ii) a difference between the first point of view of the sensor associated with the real-world vehicle represented in the log data and the second point of view of the simulated sensor not represented in the log data;

sending the simulated sensor data to the autonomous vehicle controller;

determining, based at least in part on the perception component and the planning component associated with the simulated autonomous vehicle, occlusion data associated with the first simulated object and the second simulated object, the occlusion data not represented in the portion of the log data; and determining, by the autonomous vehicle controller and based at least in part on the simulated sensor data and the occlusion data, a trajectory of the simulated autonomous vehicle in the three-dimensional representation of the environment.

2. The system of claim 1, wherein:

the portion of the log data represents a disengagement event associated with the real-world vehicle at a first location in the environment and at a second time; and the driving simulation includes the simulated autonomous vehicle traversing past a second location in the three-dimensional representation of the environment corresponding to the first location at the simulation time corresponding to the second time.

3. The system of claim 1, wherein:

the portion of the log data represents the first object at a location in the environment at the first time, the first object being a first object type, and the simulated sensor data represents the first simulated object at a simulated location in the three-dimensional representation of the environment at the simulation time corresponding to the first time, the simulated location corresponding to the location in the environment, and the first simulated object being a second object type that is different from the first object type.

4. A method comprising:

generating, based at least in part on log data corresponding to a real-world vehicle traversing an environment, a three-dimensional representation of the environment, wherein a portion of the log data represents a first point of view of a sensor associated with the real-world vehicle traversing the environment at a first time, the portion of the log data representing a first object that is in view of the sensor associated with the real-world vehicle and a second object that is in view of the sensor associated with the real-world vehicle;

executing a driving simulation including a simulated autonomous vehicle traversing the three-dimensional representation of the environment and controlled by an autonomous vehicle controller, wherein the simulated autonomous vehicle includes a simulated sensor, a first simulated object, and a second simulated object;

generating, by the simulated sensor, simulated sensor data at a simulation time corresponding to the first time and at a simulated point of view corresponding to a second point of view that is different than the first point of view of the sensor associated with the real-world vehicle, the simulated point of view not represented in the portion of the log data, the simulated sensor data indicating that the first simulated object is at least partially occluded by the second simulated object, wherein this occlusion is based at least in part on (i) a difference between a first position of the real-world vehicle represented in the log data and a second position of the simulated autonomous vehicle not represented in the log data and (ii) a difference between the first point of view of the sensor associated with the real-world vehicle represented in the log data and the second point of view of the simulated sensor not represented in the log data;

determining, based at least in part on a perception component and a planning component associated with the simulated autonomous vehicle, occlusion data associated with the first simulated object and the second simulated object, the occlusion data not represented in the portion of the log data; and determining, by the autonomous vehicle controller and based at least in part on the simulated sensor data and the occlusion data, a trajectory of the simulated autonomous vehicle.

5. The method of claim 4, wherein:

the portion of the log data further represents a disengagement event associated with the real-world vehicle at a location in the environment and at a second time; and the driving simulation includes the simulated autonomous vehicle traversing past a second location in the three-dimensional representation of the environment corresponding to the location at the simulation time corresponding to the second time.

6. The method of claim 4, wherein:

the portion of the log data represents the first object at a location in the environment at the first time, the first object being a first object type, and the simulated sensor data represents the first simulated object at a simulated location in the three-dimensional representation of the environment at the simulation time corresponding to the first time, the simulated location corresponding to the location in the environment, and the first simulated object being a second object type that is different from the first object type.

7. The method of claim 4, further comprising:

identifying the first object in the environment represented by the log data and corresponding to the first simulated object;

identifying a first location of the first object in the environment at a second time represented by the log data;

identifying a second location of the first object in the environment at a third time represented by the log data, the third time being subsequent to the second time;

determining a first object type of the first object based at least in part on the log data; and identifying a simulated vehicle model corresponding to the first object type, wherein the driving simulation includes interpolating a motion of the first simulated object through the three-dimensional representation of the environment from a first simulated location corresponding to the first location and to a second simulated location corresponding to the second location based at least in part on the simulated vehicle model.

8. The method of claim 7, wherein the driving simulation includes extrapolating the motion of the first simulated object through the three-dimensional representation of the environment from the second simulated location to a third simulated location based at least in part on the simulated vehicle model.

9. The method of claim 4, wherein the simulated sensor is a multimodal simulated sensor and the simulated sensor data comprises at least one of lidar data, radar data, sonar data, time-of-flight data, or image data.

10. One or more non-transitory computer-readable media storing instructions executable by a processor, wherein the instructions, when executed, cause the processor to perform operations comprising:
receiving log data corresponding to a real-world vehicle traversing an environment, wherein a portion of the log data represents a first point of view of a sensor associated with the real-world vehicle traversing the environment at a first time, the portion of the log data representing a first object that is in view of the sensor associated with the real-world vehicle and a second object that is in view of the sensor associated with the real-world vehicle;
generating, based at least in part on the log data, a three-dimensional representation of the environment;
executing a driving simulation including a simulated autonomous vehicle traversing the three-dimensional representation of the environment and controlled by an autonomous vehicle controller, wherein the simulated autonomous vehicle includes a simulated sensor, a first simulated object, and a second simulated object;
generating, by the simulated sensor, simulated sensor data at a simulation time corresponding to the first time and at a simulated point of view corresponding to a second point of view that is different than the first point of view of the sensor associated with the real-world vehicle, the simulated point of view not represented in the log data, the simulated sensor data indicating that the first simulated object is at least partially occluded by the second simulated object, wherein this occlusion is based at least in part on (i) a difference between a first position of the real-world vehicle represented in the log data and a second position of the simulated autonomous vehicle not represented in the log data and (ii) a difference between the first point of view of the sensor associated with the real-world vehicle represented in the log data and the second point of view of the simulated sensor not represented in the log data;
determining, based at least in part on a perception component and a planning component associated with the simulated autonomous vehicle, occlusion data associated with the first simulated object and the second simulated object, the occlusion data not represented in the portion of the log data; and
determining, by the autonomous vehicle controller and based at least in part on the simulated sensor data and the occlusion data, a trajectory of the simulated autonomous vehicle.

11. The one or more non-transitory computer-readable media of claim 10, wherein a simulated configuration of the simulated sensor is different from a configuration of the sensor associated with the real-world vehicle traversing the environment.

12. The one or more non-transitory computer-readable media of claim 10, the operations further comprising:
identifying the first object in the environment represented by the log data and corresponding to the first simulated object;
identifying a first location of the first object in the environment at the first time represented by the log data;
identifying a second location of the first object in the environment at a second time represented by the log data, the second time being subsequent to the first time;
determining an object type of the first object based at least in part on the log data; and
identifying a simulated vehicle model corresponding to the object type,
wherein the driving simulation includes interpolating a motion of the first simulated object through the three-dimensional representation of the environment from a first simulated location corresponding to the first location and to a second simulated location corresponding to the second location based at least in part on the simulated vehicle model.

13. The system of claim 1, the operations further comprising:
determining an outcome for the driving simulation, the outcome indicating whether a predetermined assertion was triggered.

14. The system of claim 1, wherein determining the trajectory of the simulated autonomous vehicle in the three-dimensional representation of the environment is based in part on the log data generated by a physical vehicle and the simulated sensor data generated by the simulated sensor.

15. The system of claim 1, wherein the first simulated object is in motion and the occlusion data results at least in part from the first simulated object being in motion.

16. The system of claim 1, wherein the driving simulation is configured to test a performance of one or more vehicle components of the real-world vehicle.

17. The system of claim 1, wherein the driving simulation is configured to be executed in parallel with additional simulations having different variations or permutations between individual simulations.

18. The system of claim 1, the operations further comprising:
determining an object instantiation attribute associated with the first simulated object or the second simulated object, the object instantiation attribute indicating how the simulated autonomous vehicle detected the first simulated object or the second simulated object within the driving simulation.

19. The system of claim 1, the operations further comprising:
determining an object termination attribute associated with the first simulated object or the second simulated object, the object termination attribute indicating a cause for the simulated autonomous vehicle no longer detecting the first simulated object or the second simulated object within the driving simulation.

20. The system of claim 19, wherein the cause for the simulated autonomous vehicle no longer detecting the first simulated object or the second simulated object comprises at least one of:
determining that the simulated autonomous vehicle moved away from the first simulated object or the second simulated object, determining that the first simulated object or the second simulated object moved away from the simulated autonomous vehicle, or determining at least one of the first simulated object or the second simulated object is occluded.

\* \* \* \* \*